(12) United States Patent
Chou et al.

(10) Patent No.: US 12,220,734 B1
(45) Date of Patent: Feb. 11, 2025

(54) INFORMATION HANDLING SYSTEM SELF-CLEANING STYLUS

(71) Applicant: Dell Products L.P., Round Rock, TX (US)

(72) Inventors: Kuan-Hung Chou, Taipei (TW); Yuan-Wei Chang, Zhubei (TW); David W. Grunow, Round Rock, TX (US); Yi-Chung Chu, New Taipei (TW); Chin-Chung Wu, Taipei (TW); Ai-Wei Liu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/384,120

(22) Filed: Oct. 26, 2023

(51) Int. Cl.
 *B08B 7/00* (2006.01)
 *G06F 3/0354* (2013.01)
 *G06F 3/038* (2013.01)
 *G06F 3/039* (2013.01)

(52) U.S. Cl.
 CPC ........ *B08B 7/0035* (2013.01); *G06F 3/03545* (2013.01); *G06F 3/0383* (2013.01); *G06F 3/039* (2013.01)

(58) Field of Classification Search
 CPC ................ G06F 3/03545; G06F 2200/1632
 USPC ........................................................ 345/179
 See application file for complete search history.

(56) References Cited

U.S. PATENT DOCUMENTS

| | | | |
|---|---|---|---|
| 9,025,318 B2 * | 5/2015 | Ashcraft | G06F 1/26 361/679.01 |
| 10,070,667 B2 | 9/2018 | Lord et al. | |
| 10,703,297 B1 * | 7/2020 | Cohen | B60N 3/103 |
| 10,732,679 B2 | 8/2020 | Wu et al. | |
| 2005/0166076 A1 | 7/2005 | Truong | |
| 2018/0059817 A1 * | 3/2018 | Pirie | G06F 3/03545 |
| 2022/0413635 A1 * | 12/2022 | Lin | F16M 13/02 |
| 2024/0085947 A1 * | 3/2024 | Ruscher | G06F 1/1656 |

* cited by examiner

Primary Examiner — Koosha Sharifi-Tafreshi
(74) Attorney, Agent, or Firm — Zagorin Cave LLP; Robert W. Holland

(57) ABSTRACT

An information handling system stylus self-cleans a magnet garage arrangement with a garage variable magnet having a first magnetic attraction when the stylus is proximate and information handling system garage and a second magnetic attraction when the stylus is distal the information handling system garage. The second magnetic attraction has a reduced attractive force at the stylus housing outer surface to discourage attraction of contaminants that might scratch or otherwise damage the housing.

20 Claims, 3 Drawing Sheets

INFORMATION HANDLING SYSTEM SELF-CLEANING STYLUS

BACKGROUND OF THE INVENTION

Field of the Invention

The present invention relates in general to the field of portable information handling systems, and more particularly to an information handling system self-cleaning stylus.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

For many end users, information handling systems have replaced paper for accepting handwritten notes. Stylus devices are often used to help end user interactions writing on an information handling system, both for note taking and drawing. A stylus has the shape of a pen and terminates with a writing tip that offers the end user precise placement at which inputs are made at a touchscreen display. In some instances, the writing tip as an active end that is better detected by a capacitive touchscreen to help with input precision. The stylus will also have active communication with the information handling system, such as by BLUETOOTH, to help control the active tip and support end user interactions with the stylus when active. Typically the stylus accepts a charge from the information handling system for a battery that supports power use of the writing tip, radio and a processing resource. In addition, the stylus will typically "garage" at the information handling system to store the stylus between uses and also align the stylus with charging contacts.

One common technique to garage a stylus is to have opposite pole magnets in the stylus and information handling system attracts the stylus to the side of the housing of the information handling system. To prevent the stylus from falling away, the magnets tend to have a significant magnetic attraction. One difficulty with this type of garage arrangement is that the magnets on the information handling system and stylus can attract particles that contaminate the contact location between the stylus and information handling system housing. In some instances, these contaminants can cause damage at the contact location, such as scratching, that can detract from the appearance of the information handling system and stylus.

SUMMARY OF THE INVENTION

Therefore, a need has arisen for a system and method which self-cleans contaminants at a garage contact location.

In accordance with the present invention, a system and method are provided which substantially reduce the disadvantages and problems associated with previous methods and systems for magnetically coupling a device to an information handling system housing. Magnetic attraction at an outer surface of a device, such as a stylus, is increased when magnetically coupling to a garage, such as an information handling system housing, and decreased when not garaged so that the device self-cleans contaminants otherwise magnetically attracted to the device housing.

More specifically, a portable information handling system processes information with processing components disposed inside a portable housing, such as processor that processes information by executing instructions and a memory that stores the instructions and information. A garage magnet located at a side surface of the information handling system magnetically couples a stylus to the housing by opposite pole attraction to a garage variable magnet disposed in the stylus. The garage variable magnet has a first magnetic attraction when garaged at the information handling system and a second magnetic attraction of substantially less than the first magnetic attraction when distal the garage magnet. In one embodiment, the garage variable magnet moves within a channel in the stylus housing interior between a first position at the stylus housing exterior side that increases magnetic attraction to the garage and a second position at the stylus housing interior that decreases magnetic attraction to self-clean the stylus housing exterior. In another embodiment, the garage variable magnet is an electropermanent magnet that has an on state when garaged and an off state when self-cleaning the stylus housing exterior.

The present invention provides a number of important technical advantages. One example of an important technical advantage is that a stylus or other device that is magnetically garaged has the magnetic attraction selectively reduced when not garaged so that contaminants at the stylus housing exterior are released. Reduced contaminants at the stylus housing exterior reduces the risk of scratches or other damage happening at the garage location, such as an information handling system housing, so that the aesthetic appearance of the information handling system housing has reduced risk of damage.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system stylus garages at an information handling system housing with a garage variable magnet that reduces magnetic attraction at the stylus housing when not garaged to reduce accumulation of contaminants at the stylus housing. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
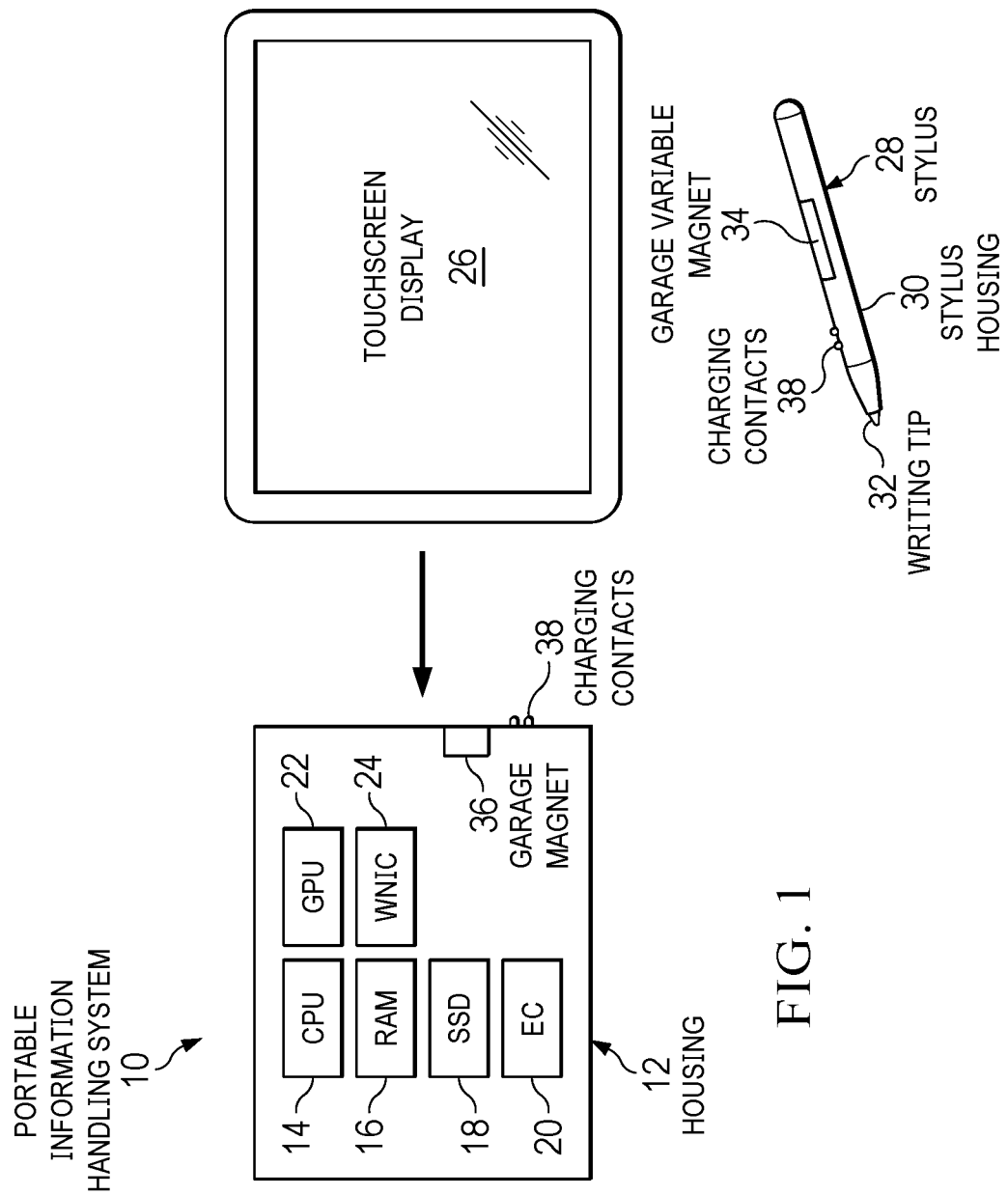
FIG. 1 depicts a block diagram of an exploded view of a portable information handling system configured to garage a self-cleaning stylus.

Referring now to FIG. 1, a block diagram depicts an exploded view of a portable information handling system 10 configured to garage a self-cleaning stylus 28. In the example embodiment, portable information handling system 10 has a tablet configuration with a planar housing 12 that supports processing components covered by a touchscreen display 26. A central processing unit (CPU) 14 disposed in the housing processes information by executing instructions in cooperation with a random access memory (RAM) 16 that stores the instructions and information. A solid state drive (SSD) 18 has non-transient storage, such as flash memory, that stores information and instructions during system power down. An embedded controller 20 manages physical operations at the information handling system, such as application of power and interactions with input/output (I/O) devices. As an example, SSD 18 stores an operating system and applications in persistent storage that embedded controller 20 retrieves at system power up to execute on CPU 14. Although the example embodiment depicts a tablet format, in alternative embodiments a convertible system may be used that includes a keyboard and touchpad in housing 12.

During operations, a graphics processing unit (GPU) 22 processes the information to define visual images for presentation at touchscreen display 26, such as by generating pixel values to define colors of pixels of the touchscreen display that present a composite visual image. A wireless network interface controller (WNIC) 24 supports wireless communication with external devices, such as through a wireless local area network (WNIC) and a wireless personal area network (WPAN) like Bluetooth. A stylus 28 has a writing tip 32 extending from one end of a stylus housing 30 to write as inputs on touchscreen display 26. For example, touchscreen display 26 includes a capacitive touch detection surface that accepts touch inputs for communication through embedded controller 20 to CPU 14 as inputs to the operating system or an application. Stylus inputs may include handwritten notes or drawings made on the touchscreen display that the operating system and applications present as visual images through GPU 22. During stylus interactions, WNIC 24 communicates with stylus 28 to coordinate stylus inputs by adjusting writing tip settings for active touch detection and other types of inputs.

When stylus 28 is not in use, an end user can garage the stylus by attachment to housing 12 through magnetic attraction. A garage magnet 36 couples to the interior of housing 12 to magnetically couple stylus housing 30 against housing 12 by attraction to a garage variable magnet 34 coupled in the interior of stylus housing 30. In the example embodiment, when garage variable magnet 34 couples to garage magnet 36, electrical charging contacts 38 align to transfer power from information handling system 10 to stylus 28. One difficulty with the use of magnets to garage stylus 28 to information handling system 10 is that the magnets tend to attract contaminants that include any micro ferromagnetic material. The contaminants can cause damage to the housing 12 and also the stylus housing 30 as hard micro grit scratches against polished or painted metal and plastic. To address this problem, garage variable magnet 34 decreases the amount of magnetic attraction at the outer surface of stylus housing 30 when stylus 28 is not garaged so that contaminants gathered during garaging self-clean by dropping away when the magnetic attraction decreases and additional contaminants are not attracted when the stylus is not garaged. In addition, garage magnet 36 may also decrease the magnetic attraction at housing 12 when the stylus is not garaged to also self-clean and reduce accumulation of contaminants when the stylus is not garaged.

In one embodiment, garage variable magnet 34 has an automated mechanical adjustment of magnetic attraction at the stylus housing by withdrawing the magnet to an interior position so that the distance between the magnet and stylus housing exterior is increased. The mechanical adjustment may use a ferromagnetic piece of material in the interior to attract the magnet to an interior position when not garaged yet release the stylus magnet when proximate the garage magnet of the information handling system. Alternatively, other interior biasing devices may be used, such as a spring that pushes the magnet to an interior position until proximity with garage magnet 36 pulls the stylus magnet to a position close to the housing outer surface. A similar configuration may be used for garage magnet 36 so long as the magnetic attraction when the opposing magnets are retracted to the interior position is sufficient to overcome the interior biasing force. As an alternative, an electropermanent magnet may be used as the garage variable magnet 34 and garage magnet 36. Electropermanent magnets have a pair of magnets with one of the magnets having a coil that accepts a current to generate a magnet field. When the current flows in one direction it sets the direction of the magnet pole in a first direction, and when the current flows in an opposite direction it sets the direction of the magnet pole in an opposite direction. The effect is that the electropermanent magnet turns the magnetic field on and off by having like poles aligned and opposite poles aligned. When stylus 28 is not garaged, garage variable magnet 34 is turned off to self-clean contaminants. When stylus 28 is garaged, garage variable magnet 34 is turned on to support magnetic coupling to garage magnet 36. A command to turn on garage variable magnet may be initiated locally with logic on stylus 28, such as by detection of contact by charging contacts 38, or may be initiated from information handling system 10 and communicated through a wireless command. In various embodiments, garage magnet 36 may also have variable magnetic attraction by an electropermanent magnet. Further, the electropermanent magnet may be used on information handling system 10 to cooperate with a mechanical variable magnet on stylus 28 and vice versa.

Figure 2:
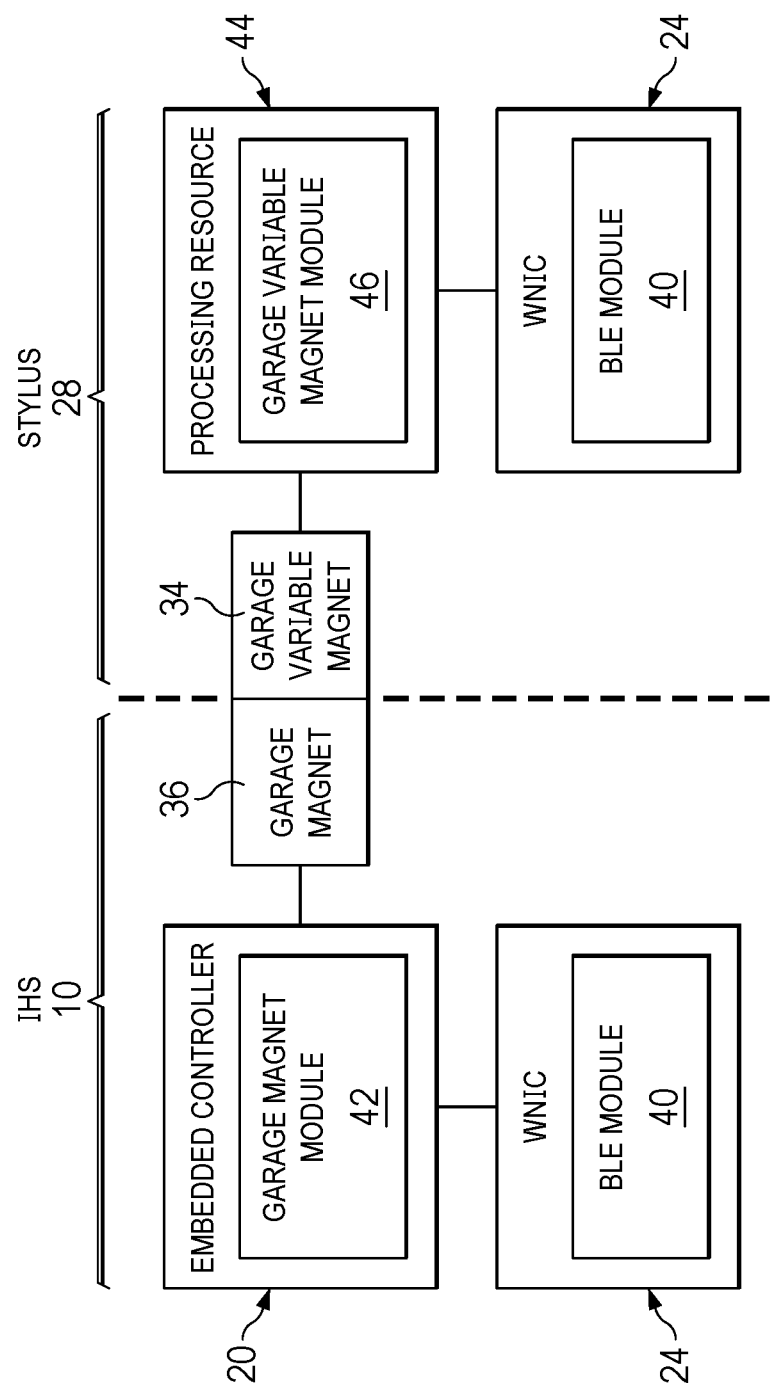
FIG. 2 depicts a block diagram of a system to magnetically couple a self-cleaning stylus.

Referring now to FIG. 2, a block diagram depicts a system to magnetically couple a self-cleaning stylus. In the example embodiment, information handling system 10 embedded controller 20 includes a non-transient memory that stores garage magnet module 42 instructions to manage stylus garaging and self-cleaning. Stylus 28 includes a processing resource 44, such as microcontroller unit (MCU) that includes non-transient memory storing garage variable magnet module 46 instructions. Each of information handling system 10 and stylus 28 includes a WNIC 24 with a BLE module 40 that coordinates wireless communication, such as through Bluetooth. In the example embodiment, garage magnet 36 is an electropermanent magnet that is turned on when garaging stylus 28 and turned off when not garaging stylus 28, with the magnet on and off states controlled by a GPIO of embedded controller 20 and instructions of garage magnet module 42. For example, when stylus 28 is in use garage magnet is placed in an off state to self-clean the garage area of the housing. As another example, when information handling system 10 transitions to an off state, garage magnet is turned on to support garaging of stylus 28. Wireless communication through WNIC 24 allows garage magnet module 42 to coordinate the garage magnet state with the garage variable magnet on and off states. In another alternative embodiment, garage magnet 36 and garage variable magnet 34 are turned off when electrical contacts of the information handling system and stylus are not touching and turned on when the electrical contacts are touching. In another embodiment, a button on the information handling system and stylus accepts a manual input by a press of an end user to turn the magnetic attraction on. In other embodiments, garage magnet module 42 and garage variable magnet module 46 may use other indicators to turn the magnets on and off, and may use periodic off states when not garaged to self-clean while leaving the magnets on for the majority of time to be ready to garage the magnets.

Figure 3:
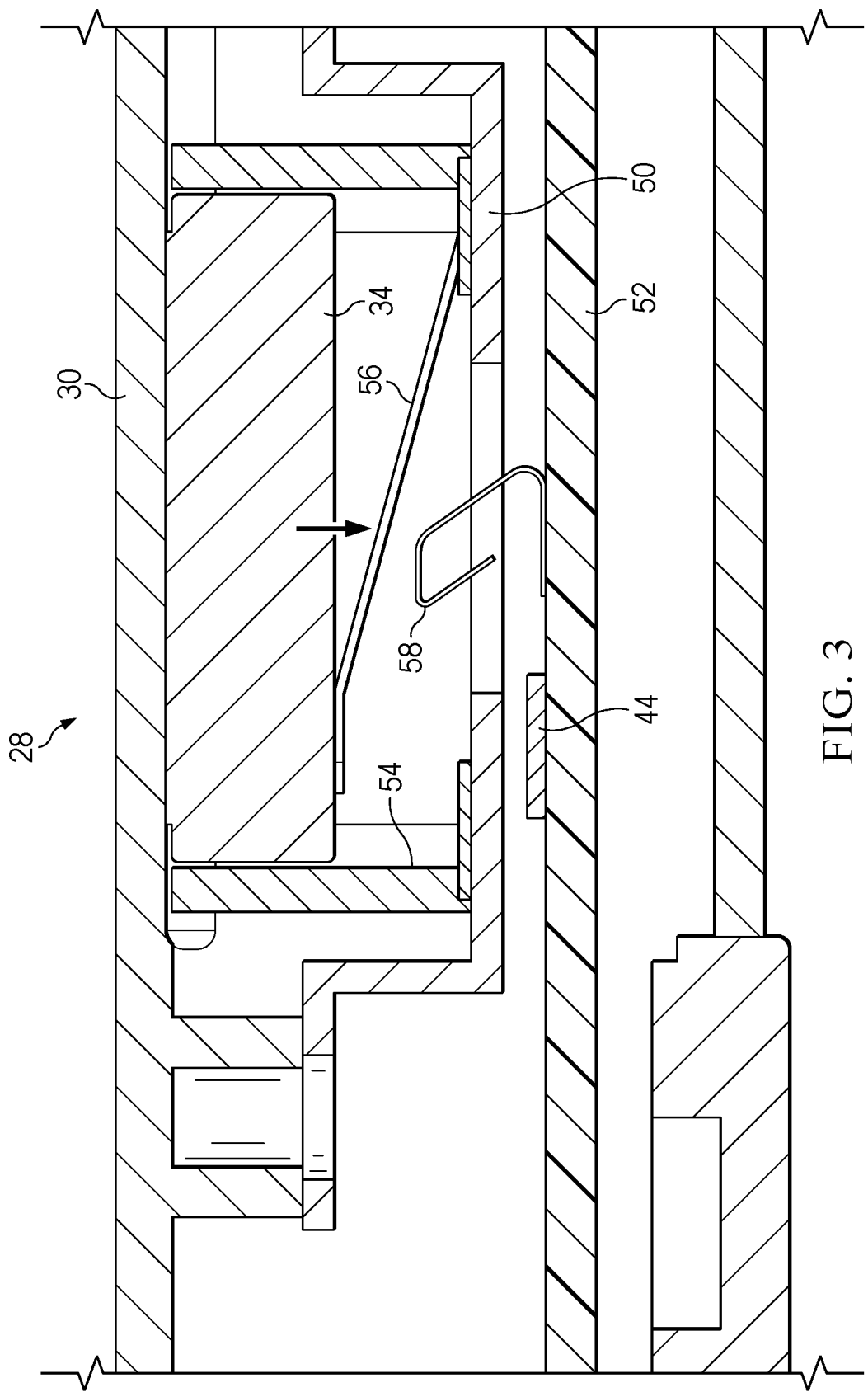
FIG. 3 depicts a sectional side view of a self-cleaning stylus configured to reduce magnetic attraction at the stylus housing when not garaged at an information handling system housing.

Referring now to FIG. 3, a sectional side view depicts a self-cleaning stylus 28 configured to reduce magnetic attraction at the stylus housing 30 when not garaged at an information handling system housing. In the example embodiment, the amount of magnetic attraction at stylus housing 30 outer surface is managed by moving magnet 34 mechanically close and distal stylus housing 30 outer surface. Magnet 34 slides to stylus housing interior and exterior in a magnet channel 54 with an interior position bias supplied by a ferromagnetic material 50 at the inner side of magnet channel 54. When distal the information handling system garage magnet, ferromagnetic material 50 attracts garage variable magnet 34 to an interior position. When placed proximate the garage magnet of the information handling system, the garage magnet attracts garage variable magnet 34 toward the stylus housing exterior to increase the magnetic attraction for garaging. In one example embodiment, with a garage housing thickness of 0.7 mm and movement in magnet channel 54 of 0.8 to 1 mm, the magnetic attraction is decreased with the interior position by a substantial amount, such as to 15% or less of the magnetic attraction at the exterior position. A leaf spring 56 helps to bias garage variable magnet 34 towards the exterior position when the garage magnet provides magnetic attraction. A switch 58 extends up from a printed circuit board to have an up position when the magnet is at the exterior position and to have a depressed position when magnet is in an interior position. Switch 58 interfaces with a printed circuit board 52 and processing resource 44 that detects the stylus garage state based upon the position of switch 58.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions to process information;
   a memory disposed in the housing and interfaced with the processor and operable to store the instructions and information;
   a stylus garage at the housing and configured to couple a stylus to the housing; and
   a stylus having a stylus housing terminating at one end with a writing tip and having a garage variable magnet completely enclosed in the stylus housing, the garage variable magnet having a first magnetic attraction level at the stylus housing to magnetically couple the stylus to the stylus garage and a second magnetic attraction at the stylus housing of substantially less than the first magnetic attraction, the second magnetic attraction automatically selected when the stylus does not couple to the stylus garage.

2. The information handling system of claim 1 further comprising:
   a garage magnet coupled at the stylus garage and having an opposite polarity to the garage variable magnet to attract the stylus to a garaged position; and
   a ferromagnetic material coupled in the stylus housing interior to the garage variable magnet to pull the garage variable magnet inward and away from an outer surface of the housing when the stylus separates from the garage.

3. The information handling system of claim 2 further comprising a leaf spring between the garage variable magnet and the ferromagnetic material to bias the garage variable magnet away from the ferromagnetic material.

4. The information handling system of claim 3 further comprising a switch extending past the ferromagnetic material and aligned with the garage variable magnet, the garage variable magnet contacting the switch when the garage variable magnet attracts to the ferromagnetic material.

5. The information handling system of claim 4 further comprising a processing resource disposed in the stylus and interfaced with the switch to detect when the garage variable magnet attracts to the ferromagnetic material.

6. The information handling system of claim 1 wherein the garage variable magnet comprises an electropermanent magnet having an on state when the stylus couples to the garage and an off state when the stylus is distal the garage.

7. The information handling system of claim 6 wherein the garage further comprises an electropermanent magnet coupled in the housing and having an on state when the stylus couples to the garage and an off state when the stylus is distal the garage.

8. The information handling system of claim 6 further comprising:
electrical contacts exposed on the housing to charge the stylus; and
electrical contacts exposed on the stylus housing to accept charge from the housing electrical contacts.

9. The information handling system of claim 8 further comprising a processor disposed in the stylus and interfaced with the stylus housing electrical contacts, the processor turning on the electropermanent magnet when the stylus housing electrical contacts are in communication with the housing electrical contacts and turning off the electropermanent magnet when the stylus housing electrical contacts are not in communication with the housing electrical contacts.

10. A method for self-cleaning an information handling system stylus, the method comprising:
magnetically coupling the stylus to an information handling system housing with a first magnetic attraction level at a housing of the stylus provided by a magnet completely enclosed in the housing;
detecting removal of the stylus from the information handling system housing; and
in response to removal, automatically suppressing magnetic attraction of the stylus to a second magnetic attraction level at the housing with the magnet completely enclosed in the housing to release contaminants from the stylus.

11. The method of claim 10 further comprising:
coupling a stylus magnet in a channel within the stylus;
biasing the stylus magnet towards the stylus housing exterior when magnetically coupling to the information handling system housing; and
biasing the stylus magnet towards the stylus housing interior when decoupling from the information handling system housing.

12. The method of claim 11 further comprising:
coupling a garage magnet in the information handling system housing, the garage magnet and stylus magnet having opposing polarities;
biasing the stylus magnet towards the stylus housing exterior by magnetic attraction to the garage magnet;
coupling a ferromagnetic material in the stylus housing interior; and
biasing the stylus magnet towards the ferromagnetic material when distal the garage magnet.

13. The method of claim 12 further comprising:
engaging a spring with the stylus magnet; and
biasing the stylus magnet away from the ferromagnetic material with the spring.

14. The method of claim 10 wherein:
the stylus magnet comprises an electropermanent magnet;
magnetically coupling comprises turning on the magnetic field of the electropermanent magnet; and
automatically suppressing comprises turning off the electropermanent magnet.

15. The method of claim 14 further comprising:
aligning charging contacts of the stylus and the information handling system housing when magnetically coupling the stylus to the information handling system housing; and
charging the stylus from the information handling system through the contacts.

16. The method of claim 15 further comprising:
detecting the stylus contacting the information handling system housing;
turning on the magnetic field when detecting the contacting; and
turning off the magnetic field when not detecting the contacting.

17. A stylus comprising:
a stylus housing;
a writing tip at an end of the stylus housing; and
a garage variable magnet completely enclosed in the stylus housing and having a first magnetic attraction when proximate an information handling system to magnetically couple the stylus to the information handling system and a second magnetic attraction automatically selected when distal the information handling system to self-clean particles from the stylus housing.

18. The stylus of claim 17 further comprising:
a garage magnet coupled in the information handling system and having an opposite polarity to the garage variable magnet to attract the stylus to the information handling system; and
a ferromagnetic material coupled in the stylus housing interior to the garage variable magnet to pull the garage variable magnet inward and away from an outer surface of the stylus housing when the stylus separates from the information handling system.

19. The stylus of claim 18 further comprising a spring between the garage variable magnet and the ferromagnetic material to bias the garage variable magnet away from the ferromagnetic material.

20. The stylus of claim 17 wherein the garage variable magnet comprises an electropermanent magnet having an on state when the stylus couples to the information handling system and an off state when the stylus is distal the information handling system.

* * * * *